United States Patent [19]
Hofmann et al.

[11] Patent Number: 4,603,983
[45] Date of Patent: Aug. 5, 1986

[54] AXIAL SHIFT ARRANGEMENT FOR TWO-ROW ANGULAR-CONTACT BEARING

[75] Inventors: Heinrich Hofmann, Schweinfurt; Günter Markfelder, Üchtelhausen, both of Fed. Rep. of Germany

[73] Assignee: FAG Kugelfischer Georg Schafer (KgaA), Fed. Rep. of Germany

[21] Appl. No.: 798,176

[22] Filed: Nov. 14, 1985

[30] Foreign Application Priority Data

Dec. 22, 1984 [DE] Fed. Rep. of Germany ....... 3447150

[51] Int. Cl.⁴ .............................................. F16C 19/18
[52] U.S. Cl. .................................... 384/512; 384/517; 384/611
[58] Field of Search ............... 384/512, 517, 510, 611, 384/559, 582, 536, 537

[56] References Cited
U.S. PATENT DOCUMENTS

| | | | |
|---|---|---|---|
| 1,429,065 | 9/1922 | Daggett | 384/512 |
| 2,803,507 | 8/1957 | Mempel et al. | 384/536 |
| 4,173,376 | 11/1979 | Standing et al. | 384/517 |
| 4,551,032 | 11/1985 | Mottershead | 384/517 |

Primary Examiner—Lenard A. Footland
Attorney, Agent, or Firm—Ostrolenk, Faber, Gerb & Soffen

[57] ABSTRACT

A two-row angular contact ball bearing with two axially spaced inner races arranged in the shaft and outer rings with outer races disposed around the inner races. The outer rings are held apart by a bushing. One end of the bushing rests against one of the outer rings. The other end of the bushing has a radially enlarged end section which extends over the other outer ring and defines a free space between the other outer ring and a shoulder at the beginning of the enlarged section of the bushing. An annular, conical spring is in the free space between the outer ring and the shoulder. A cutout in the bushing enables installation of hardening material in the free space radially outside the annular spring for rigidifying the spacing of the bearings once the shaft carrying the bearings has been installed in a final installation.

13 Claims, 1 Drawing Figure

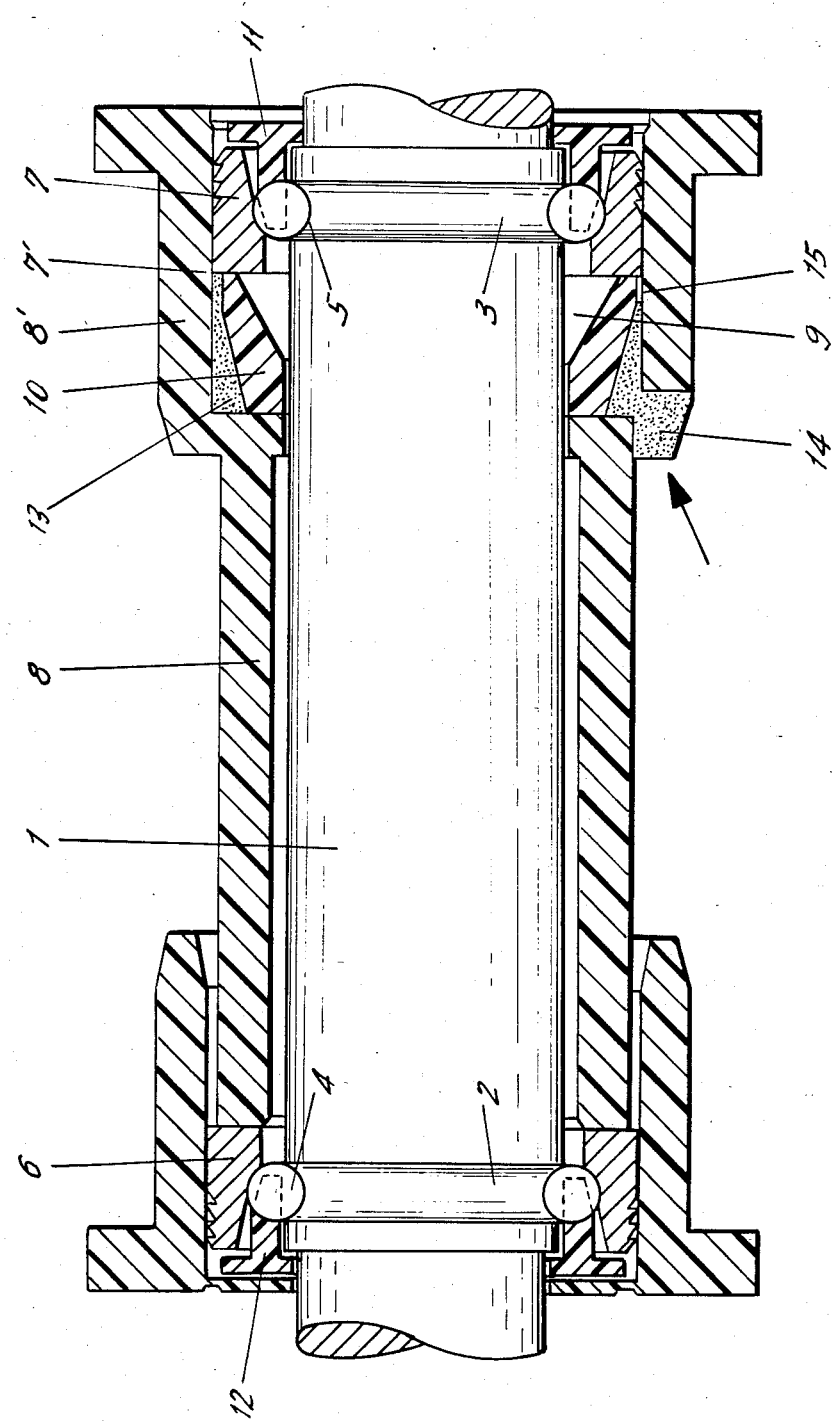

AXIAL SHIFT ARRANGEMENT FOR TWO-ROW ANGULAR-CONTACT BEARING

BACKGROUND OF THE INVENTION

The invention relates to a two-row angularcontact bearing, wherein the two rows of bearings are separated by a bushing and a spring normally holds the two rows at the desired spacing apart.

Bearings of this type are known from Federal Republic of Germany Application No. DE-OS 32 31 138. The embodiment shown in FIG. 4 thereof permits simple mounting of the bearing. Each of the two outer rings can be shifted axially due to the free space in the bushing in which a spring is located. After normal mounting of one of the individual bearings, it is possible also to readily mount the second individual bearing, as the outer ring is pushed away axially against the spring. The spring is customarily so dimensioned that after the introduction of the second row of rolling members, the spring pushes the outer ring, which has been initially shifted for reasons of mounting, back into the correct axial position. However, when such a bearing is introduced into a machine which applies large axial forces to the bearing, the spring becomes deformed and at least one of the outer rings can then shift to such an extent that the rolling member balls at that ring no longer roll in their raceways. This leads to an early failure of the individual bearing.

SUMMARY OF THE INVENTION

The object of the present invention is therefore to improve the above type of two-row bearing to assure dependable positioning of the bearing in operation with undisplaceable outer rings, even upon the occurrence of high axial forces.

The present invention relates to a two-row angular contact bearing on a shaft, and each of the rows is preferably a ball bearing having an inner and an outer race and rolling members in the form of balls rolling between the races. The inner race is defined in and is part of the shaft and the inner races are at axially spaced locations along the shaft. A respective outer ring including an outer race is disposed around each of the inner rings and the rolling member balls roll between the races.

A bushing extends around the shaft and extends between the outer rings. It engages one of the outer rings axially. The other outer ring is surrounded by a radially enlarged end section of the bushing. That enlarged end section is joined to the main section of the bushing by a radially outwardly extending shoulder.

An axial, initially tensioned spring is disposed in a free space inside the bushing end section between the shoulder of the bushing and the adjacent outer ring for biasing the adjacent outer ring axially away from the other outer ring. The spring is preferably an annular body of elastic material, and more particularly is generally conically shaped, being narrower toward the shoulder of the bushing and wider toward the respective outer ring.

There is an open region inside the enlarged end section of the bushing and radially outside of the spring with a clear space running from the respective outer ring back to the shoulder. After assembly of the bearing in its final installation, which may cause shifting of one outer ring with respect to the other, thereby initially tensioning the spring temporarily, and after the spring returns the rings to their desired orientations, fluent hardening material is inserted in the open region radially outside of the spring. When that material hardens, it rigidifies, which fixes the spacing between the bushing shoulder and the first outer ring, and thereby fixes the spacing between the outer rings and their bearings for proper operation.

For insertion of the hardening material, in the vicinity of the shoulder, that is where the bushing widens beyond its normal outer diameter, the bushing has an axially directed cutout which communicates from the outside of the bushing into the open region for enabling installation of hardening material radially outside the spring and inside the open region.

The annular body spring includes support means thereon for resting against at least one of the interior of the enlarged end section of the bushing or the shaft. In one embodiment, the support means comprise radial projections from the annular body extending to the interior of the enlarged end section of the bushing. However, projections may extend from the annular body to the shaft for a similar purpose.

According to the invention, a bearing which is initially adapted to deform in the presence of axial forces during installation and which is subsequently resistant to axial forces once the bearing is installed has been provided.

By the use of a closed conically shaped annular body, a closed space can be obtained in simple manner within the region of the spring. After the mounting of the second bearing, that space is filled with a hardening material, which then prevents axial displacement of the outer rings. In this connection, it is necessary for the space which is filled with hardening material to extend from the face of the bushing up to the face of the outer ring. Otherwise, elastic sections of the spring annular body would still permit axial displacement of the outer rings. The hardening material should be one which is hardly elastically deformable in its final state.

The bushing which is disposed between the outer rings is most simply produced through use of axial pushers. At the shoulder transition from the bushing to the enlarged section of the bushing, it is advisable to provide an axially directed cutout which cuts into the space to be filled with hardening material. This can be readily achieved in the above-indicated method of manufacture by providing a projection on one pusher, at the place indicated. In order that the space to be filled with hardening material is definitely cut into, it is merely necessary for the projection to be in the region of the bushing in which the bore of the enlarged section of the bushing is larger than the outer surface of the bushing. The opening which results from the cutout is then used as a filling hole for the hardening material. No further measures are necessary, aside from connecting lines.

In order that the annular spring body is always arranged concentrically to the parts adjacent it, three radial projections may be provided on the annular body. The projections come to rest either in the surface of the bore of the enlarged end section of the bushing or on the shaft.

BRIEF DESCRIPTION OF THE DRAWING

Other objects and features of the invention are explained with reference to the drawing, which is a cross section through a two-row bearing of O-arrangement according to the invention.

DESCRIPTION OF THE PREFERRED EMBODIMENT

The bearing of the present invention can be used, for instance, for the crank pedal bearings of bicycles, although its use is not thus limited.

The two row bearing is formed on the shaft 1. The inner races 2 and 3 for the respective rows of rolling element balls 4 and 5 are provided in the shaft 1. The rows of balls are turnably mounted in the outer rings 6 and 7 and roll in the races of those rings. Axially between the outer rings 6 and 7, there is a bushing 8. The bushing has a radially enlarged end section 8' which is radially outside and surrounds the one outer ring 7.

Within the free space 9, which is axially inward of the outer ring 7 and is surrounded by the bushing section 8', there is a spring which comprises a closed, annular, generally conical solid body 10 of elastic resilient material. The narrow end of the spring rests on the radially outward shoulder defining the end section 8'. The wider end of the spring presses on the ring 7.

The bearing is mounted in a known manner. First, for instance, the row of balls 5 together with the cage 11, the outer ring 7, the spring 10 and the bushing 8 are mounted on the shaft 1. The second row of balls 4 together with the cage 12 is then introduced at the other end of the bushing 8, with the outer ring 6 being pushed, together with the bushing 8, axially against the spring 10 to enable mounting of the balls 4 and ring 6. A bearing is thus obtained which is suitable as a structural unit for radial loads and for low axial loads.

In order that even larger axial loads can be transmitted without axial displacement of the outer rings there is a further development. The enlarged end section 8' of the bushing, the outer ring 7 and the conical annular body 10 together define a closed space 13 outside the annular body 10 and surrounded by the end section. In this connection, the space 13 also has sections of its surface that are against the radially outward shoulder of the slide sleeve 8 and the opposing face 7' of the outer ring 7. When this space is filled from the shoulder of the bushing to the outer ring with a liquid material which hardens after its introduction, then the bearing is also made axially rigid.

To form the feed openings for the material which is to harden, an axially directed cutout 14 is provided at the shoulder transition from the bushing 8 to its enlarged end section 8'. The counter piece can be arranged on one of the axial pushers which are suited for the manufacture of the bushing 8. The cutout 14 is then obtained without additional expense. The cutout 14 must be provided in a radial region of the shoulder in which the bore of the enlarged section 8' of the bushing is larger than the outer surface of the bushing 8 i.e. the cutout is radially outward of the bushing 8. Otherwise, there would be no connection between the free space 13 and the exterior of the bushing.

In order that the annular spring body 10 will always assume a concentric position with respect to the enlarged section 8' of the bushing, three radially directed projections 15 are provided on the spring body. They rest against the internal surface of the bore of the enlarged section 8' of the bushing.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A two-row angular contact bearing on a shaft, comprising:

a first and a second inner race being defined in and around the shaft at axially spaced locations along the shaft; a first and a second outer ring disposed around and having respective first and second races around the respective first and second inner rings; bearing rolling members rollingly supported between each inner race and the race of the respective outer ring;

a bushing around the shaft and extending between the first and the second outer rings and holding the outer rings apart; the bushing having a radially extending shoulder located between the outer rings and located nearer to the first outer ring, and the shoulder defining for the bushing a radially enlarged end section which extends from the shoulder and extends past and surrounds the first outer ring; the shoulder of the bushing being so placed axially with respect to the first outer ring that a free space is defined inside the enlarged end section of the bushing between the shoulder and the first outer ring;

an axial spring in the free space for urging the first outer ring away from the second outer ring; the spring being shaped in the free space for defining in the free space an open region which extends from the shoulder to the first outer ring;

a hardening material disposed in the open region for hardening and for thereby rigidifying and fixing the spacing between the bushing shoulder and the first outer ring.

2. The bearing of claim 1, wherein the spring is an annular body of elastic material under initial tension.

3. The bearing of claim 2, wherein the open region is formed radially outside the annular body.

4. The bearing of claim 3, wherein the annular body is a closed annular, conically shaped body.

5. The bearing of claim 4, wherein the narrower end of the annular body is disposed toward the shoulder of the bushing and the wider end of the annular body is disposed toward the first outer ring.

6. The bearing of claim 4, wherein the annular body includes a support means thereon for resting against at least one of the interior of the enlarged end section of the bushing and the shaft.

7. The bearing of claim 6, wherein the support means comprise radial projections from the annular body to the interior of the enlarged section of the bushing.

8. The bearing of claim 1, wherein the bushing has an axial end which rests against the second outer ring.

9. The bushing of claim 1, where each bearing is a ball bearing and the rolling members are balls.

10. The bearing of claim 1, further comprising a respective cage at the rolling members at each of the two sets of outer and inner races.

11. The bearing of claim 1, wherein at the shoulder of the bushing, the bushing has an axially directed cutout formed therein, which cutout communicates from outside the bushing into the open region inside the enlarged end section of the bushing.

12. The bearing of claim 11, wherein the bushing has an exterior of a first outer diameter and the cutout is located in the bushing radially outwardly of the outer diameter of the bushing.

13. The bearing of claim 1, wherein the annular body includes a support means thereon for resting against at least one of the interior of the enlarged end section of the bushing and the shaft.

* * * * *